United States Patent
Martin et al.

(10) Patent No.: US 9,269,054 B1
(45) Date of Patent: *Feb. 23, 2016

(54) METHODS FOR BUILDING REGRESSION TREES IN A DISTRIBUTED COMPUTING ENVIRONMENT

(71) Applicant: BigML, Inc., Corvallis, OR (US)

(72) Inventors: Francisco J. Martin, Corvallis, OR (US); Adam Ashenfelter, Corvallis, OR (US); J. Justin Donaldson, Corvallis, OR (US); Jos Verwoerd, Corvallis, OR (US); Jose Antonio Ortega, Corvallis, OR (US); Charles Parker, Corvallis, OR (US)

(73) Assignee: BigML, Inc., Corvallis, OR (US)

( * ) Notice: Subject to any disclaimer, the term of this patent is extended or adjusted under 35 U.S.C. 154(b) by 568 days.

This patent is subject to a terminal disclaimer.

(21) Appl. No.: 13/673,064

(22) Filed: Nov. 9, 2012

Related U.S. Application Data (60) Provisional application No. 61/557,826, filed on Nov. 9, 2011, provisional application No. 61/557,539, filed on Nov. 9, 2011.

(51) Int. Cl.
*G06N 99/00* (2010.01)
*G06N 5/04* (2006.01)

(52) U.S. Cl.
CPC ............... *G06N 99/005* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 6,278,464 B1 | 8/2001 | Kohavi | |
| 6,301,579 B1 | 10/2001 | Becker | |
| 6,519,599 B1 | 2/2003 | Chickering et al. | |
| 7,386,835 B1 | 6/2008 | Desai | |
| 8,229,917 B1* | 7/2012 | Aneas et al. | 707/713 |
| 2001/0054032 A1 | 12/2001 | Goldman | |
| 2005/0097070 A1 | 5/2005 | Enis et al. | |
| 2006/0294058 A1* | 12/2006 | Zabback et al. | 707/2 |
| 2007/0094060 A1* | 4/2007 | Apps et al. | 705/7 |
| 2007/0179966 A1* | 8/2007 | Li et al. | 707/102 |
| 2008/0168011 A1 | 7/2008 | Steinberg | |
| 2009/0064053 A1 | 3/2009 | Crawford et al. | |
| 2009/0313208 A1* | 12/2009 | Helfman | 707/2 |

OTHER PUBLICATIONS

Haim et al. "A Streaming Parallel Decision Tree Algorithm," Journal of Machine Learning Research 11 (2010) 849-872, Feb. 2010.

(Continued)

*Primary Examiner* — Kakali Chaki
*Assistant Examiner* — Mai T Tran
(74) *Attorney, Agent, or Firm* — Schwabe, Williamson & Wyatt (57) ABSTRACT

Systems and methods are disclosed for building and using decision trees, preferably in a scalable and distributed manner. Our system can be used to create and use classification trees, regression trees, or a combination of regression trees called a gradient boosted regression tree (GBRT). Our system leverages approximate histograms in new ways to process large datasets, or data streams, while limiting inter-process communication bandwidth requirements. Further, in some embodiments, a scalable network of computers or processors is utilized for fast computation of decision trees. Preferably, the network comprises a tree structure of processors, comprising a master node and a plurality of worker nodes or "workers," again arranged to limit necessary communications.

33 Claims, 10 Drawing Sheets

(56) References Cited

OTHER PUBLICATIONS

Daniel D. Corkill, "Blackboard Systems," AI Expert 6(9): 40-47, Sep. 1991.

Panda et al. "PLANET: Massively Parallel Learning of Tree Ensembles with MapReduce," 12 pages Proceedings of the 35th International Conference on Very Large Data Bases (VLDB-2009).

Ned Horning: "Introduction to decision trees and random forests", Mar. 19, 2011, pp. 1-14, (http://ebookbrowse.com/decisiontrees-randomforest-v2-pdf-d82430890 [retrieved on Feb. 13, 2013] pp. 2, 3, 7.

J.R. Quinlan: "Simplifying decision trees", International Journal of Man-Machine Studies, vol. 27, No. 3, Sep. 1987. pp. 221-234.

Tyree et al: "Parallel Boosted Regression Trees for Web Search Ranking", WWW 2011, Mar. 28-Apr. 1, 2011, Hyderabad, India, pp. 387-396.

International Search Report for PCT/US12/063300; Mailing date Mar. 8, 2013.

Stolowitz Ford Cowger LLP Listing of Related Cases May 14, 2013.

* cited by examiner

FIG. 5    INITIALIZE GBRT SYSTEM TO SPEED UP PREDICTIONS

Appendix A - Example Tree Model JSON
```
{
  "tree_model":{
    "inception":"2011-06-07T17:42Z",
    "algorithm":"REPTree",
    "missing_strategy":"returnLastPrediction",
    "input_fields":[
    {
      "name":"age",
      "optype":"continuous",
      "datatype":"integer"
    },{
      "name":"sex",
      "optype":"categorical",
      "datatype":"string",
      "missing-tokens":["na", "missing"]
    }],
    "objective_field":{
      "name":"weight",
      "optype":"continuous",
      "datatype":"float"
    },
    "root":{
      "predicate":true,
      "output":62.2,
      "children":[
      {
        "predicate":{
          "field":"age",
          "operator":"lessThan",
          "value":13
        },
        "output":36.2
      },
      {
        "predicate":true,
        "output":52.2,
        "children":[
        {
          "predicate":{
            "field":"sex",
            "operator":"equal",
            "value":"male"
          },
          "output":77.1
        },
        {
          "predicate":true,
          "output":65.7
        }
        ]
      }
      ]
    }
  }
}
```

FIG. 8

```
Appendix B - Example Results Summary JSON
    {
       "name":"age",
       "missing_tokens":[["null",15]],
       "numeric_summary":{
       "min":7,
       "max":82,
       "sum":3200,
       "sum_squared":6500,
       "count":85,
       "histogram":[[12.2,12.5],[18.8,10.2],[28.2,15.7],[43,18.1],[58,15.8],[72,10.6]]
       }
    },{
       "name":"sex",
       "missing_tokens":[["null",8],{"na",6],["missing",6]],
       "categorical_summary":{
       "categories":[["male", 38],["female", 42]]
       }
    },{
       "name":"weight",
       "numeric_summary":{
       "min":31.2,
       "max":117.5,
       "sum":12600,
       "sum_squared":193200,
       "count":100,
"histogram":[[39.5,17.2],[45.8,15.9],[67.4,18.6],[78.7,19.3],[93.2,17.1],[102.4,14.6]]
    }
```

FIG. 9

```
{
  "tree_model":{
    "inception":"2011-06-07T17:42Z",
    "algorithm":"REPTree",
    "missing_strategy":"returnLastPrediction",
    "input_fields":[
    {
      "name":"age",
      "optype":"continuous",
      "datatype":"integer"
    },{
      "name":"sex",
      "optype":"categorical",
      "datatype":"string",
      "missing-tokens":["na", "missing"]
    }],
    "objective_field":{
      "name":"weight",
      "optype":"continuous",
      "datatype":"float"
    },
    "root":{
      "predicate":true,
      "output":62.2,
      "children":[
      {
        "predicate":{
          "field":"age",
          "operator":"lessThan",
          "value":13
        },
        "output":36.2
      },
      {
        "predicate":{
          "field":"age",
          "operator":"greaterThan",
          "value":13
        },
        "output":65.7
```

FROM FIG. 10A

```
"children":[
    {
        "predicate":{
            "field":"sex",
            "operator":"equal",
            "value":"male"
        },
        "output":77.1
    },
    {
        "predicate":{
            "field":"sex",
            "operator":"equal",
            "value":"female"
        },
        "output":52.5
    }
    ]
    }
    ]
    }
    ]
}
}
}
```

METHODS FOR BUILDING REGRESSION TREES IN A DISTRIBUTED COMPUTING ENVIRONMENT

RELATED APPLICATIONS

This application is a non-provisional of U.S. Provisional Application No. 61/557,826 filed Nov. 9, 2011 and U.S. provisional application 61/557,539 filed on Nov. 9, 2011 both of which are incorporated herein by this reference.

TECHNICAL FIELD

This invention pertains to computer-implemented methods and apparatus for "learning" large datasets and using decision trees in a scalable and distributed manner.

COPYRIGHT NOTICE

© 2011-2012 BigML, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Decision tree learning, used in statistics, data mining and machine learning, uses a decision tree as a predictive model which maps observations about an item to conclusions about the item's target value. More descriptive names for such tree models are classification trees or regression trees. In these tree structures, leaves represent class labels and branches represent conjunctions of features that lead to those class labels.

In machine learning, building a model or decision tree based on a large data set can take a long time. Further, the time and resources necessary to build a model increases as the required quality or depth of the model increases. Approximate histograms have been used in building decision trees. An approximate histogram was introduced by Messrs. Ben-Haim and Yom-Tov, "A Streaming Parallel Decision Tree Algorithm" (J. Machine Learning Research 11 (2010) 849-872). The histogram is built in a streaming fashion and acts as a memory-constrained approximation (or compression) of the entire dataset.

Tyree, et al. extend the histogram so that it approximates the relationship between two numeric fields. (WWW 2011-Session: Ranking, Mar. 28-Apr. 1, 2011, Hyderabad, India at 387.) Of course, a "brute force" approach of applying ever increasing resources to the problem, using known parallel and distributed processing techniques, can be useful. Still, the need remains for more effective methods to build decision trees quickly, and to better support classification problems.

SUMMARY OF PREFERRED EMBODIMENTS

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In decision analysis, a decision tree can be used to visually and explicitly represent decisions and decision making. In data mining, a decision tree describes data but not decisions; rather the resulting classification tree can be an input for decision making.

This disclosure will address both numeric predictions and classification problems. We describe improved methods and systems for mining datasets, especially large datasets. More specifically, some aspects of the present disclosure include the following:

An approximate histogram that supports classification

A method to intelligently sample a data stream to quickly grow decision trees

A system for efficient computation of decision trees using a scalable network of computers A system for fast partial evaluations of a GBRT when making classifications A compact JSON format for representing trees (including boosted trees) and their fragments.

Additional aspects and advantages of this invention will be apparent from the following detailed description of preferred embodiments, which proceeds with reference to the accompanying drawings. The invention is not intended to be limited by the drawings. Rather, the drawings merely illustrate examples of some embodiments of some aspects of this disclosure.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

DETAILED DESCRIPTION OF PREFERRED EMBODIMENTS

Figure 1:
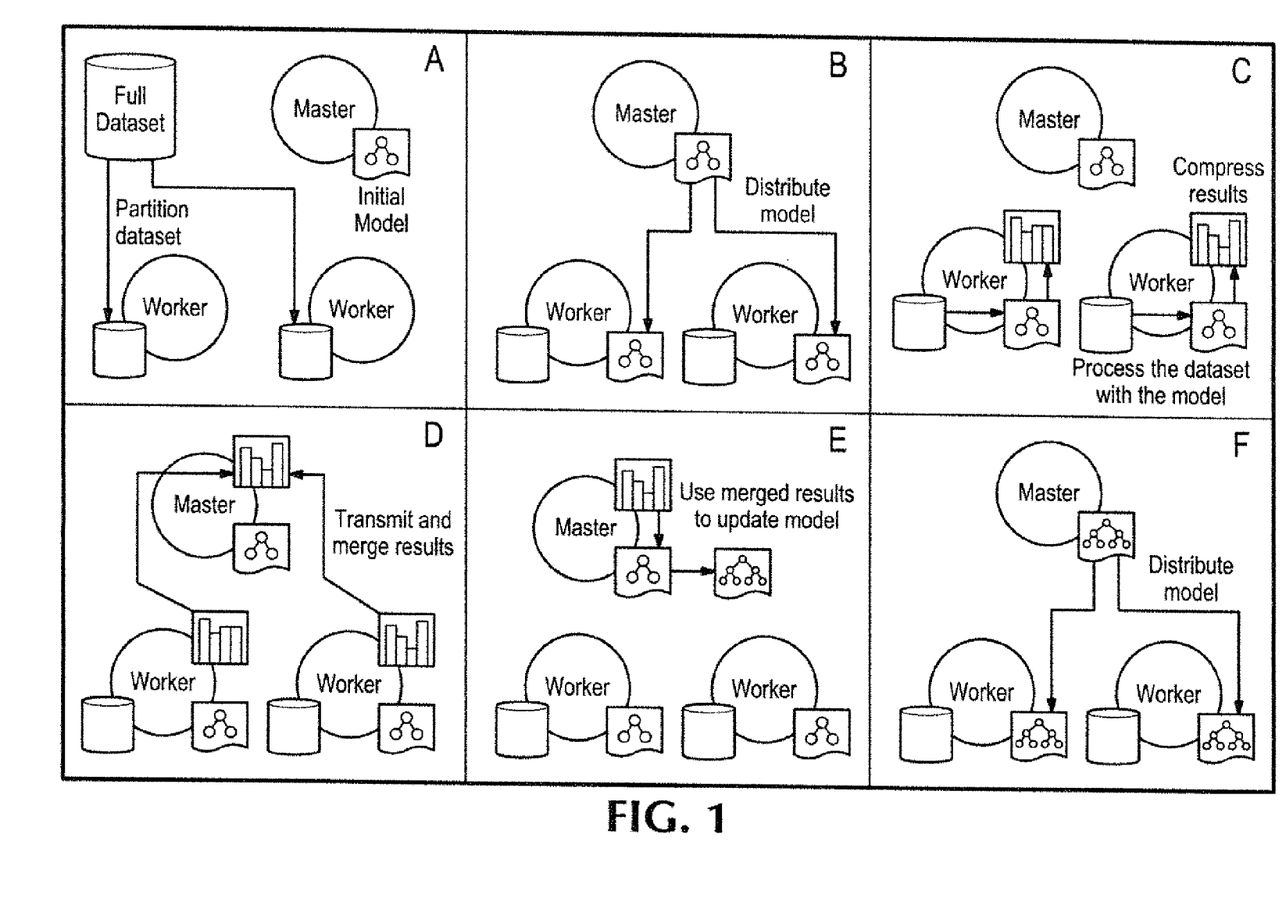
FIGS. 1A-1F are simplified conceptual diagrams that illustrate a method for building a decision tree in accordance with an aspect of the present disclosure.

FIG. 1 comprises a series of six frames, labeled A though F sequentially. Each frame shows a simplified conceptual diagram of one step of a distributed process for building a decision tree model. These "steps" are not limited to a strict sequence. To the contrary, the model building preferably is parallelized and distributed, as further discussed below. It may operate asynchronously in various respects. For example, a worker process, further described below, may report partial or final results to its parent, which may be the master process, when the worker is ready. In FIG. 1A a full dataset of training data is partitioned into a plurality of partition datasets, only two of which are shown for illustration. Each partition dataset is delivered or made available to a respective worker process ("Worker"). A Worker process, like the illustrated Master process, refers to computer software executable on a processor to provide the functionality described.

Further, with regard to FIG. 1A, the master process creates or obtains access to an initial model, for example the root of a decision tree, which may be based on a subset of the full dataset, or the entire dataset. In FIG. 1B, the master process distributes the initial model to each of the worker processes. In FIG. 1C, each of the workers processes the data of its corresponding partition dataset through the distributed model to form local results. The local results may be gathered and expressed in the form of a histogram as illustrated, which serves to compress the local results. While only a single histogram per worker is shown for illustration, in practice the worker generates a separate histogram for each input variable.

In the case of categorical data, i.e. to construct classification trees, we apply the concept of approximate histograms in a new way. We extend the histogram so that it can also represent a relationship between a numeric field and a categorical field. Our expanded histogram is further described below.

Referring now to FIG. 1D, each worker transmits its compressed results—a series of histograms—to the master process, which in turn merges the results, which may be stored in a merged histogram 140. In a simple example, where the bins have the same median values, histograms can be merged by simply summing the counts. Importantly, the illustrated structure and process may be further distributed to additional levels of worker processes. At each level, a worker reports results only to its immediate parent node. Each parent node merges those results, and reports the merged histograms to the next level up, and so on.

Returning to our example, as illustrated in FIG. 1E, the master uses the merged results from its workers to update the model. In one embodiment, the model is updated by growing an additional layer of a decision tree. Then the master distributes the updated model to each of the workers, FIG. 1F. Each worker then processes its respective partition dataset once again, this time using the updated model. Results are gathered and reported. This process is repeated iteratively, growing the tree model, until a stop condition is met. In some embodiments, one model update is generated for every iteration over the data.

We prefer not to stop a model building process on reaching an arbitrary depth of the tree. Rather, we prefer to stop the process when a monetary budget constraint is met. A budget may be established in advance by a user (customer) for a given modeling project or dataset. The dollar cost of the request can be estimated by the current costs of CPU time and I/O bandwidth. CPU time and I/O bandwidth (and storage) are now fungible and can be obtained in a competitive cloud marketplace. We can also stop the process based on a running time limit, or based on performance of the model on a holdout set of data. The constraints as well can be established in advance by a user (customer) for a given modeling project or dataset.

Figure 6:
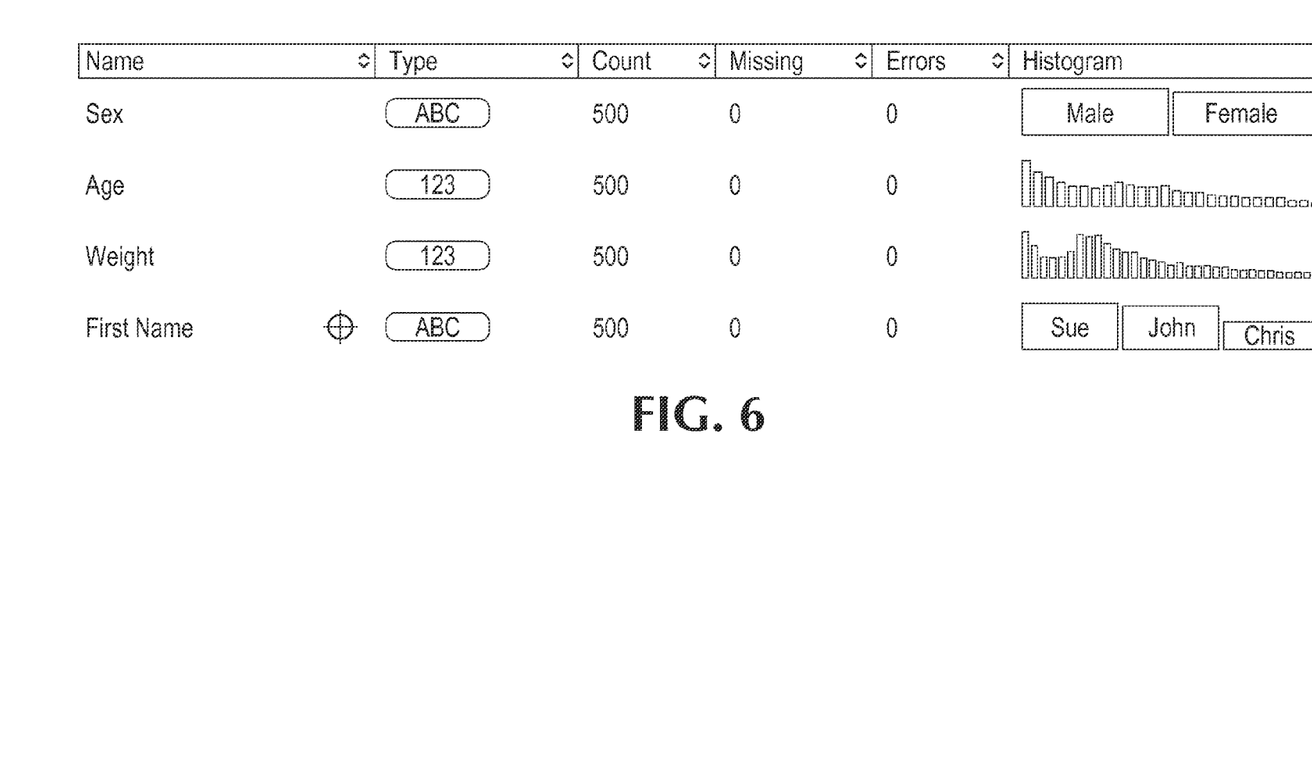
FIG. 6 is a simple example of a graphical user interface display of a dataset summary to help users visualize the fields.
Figure 9:
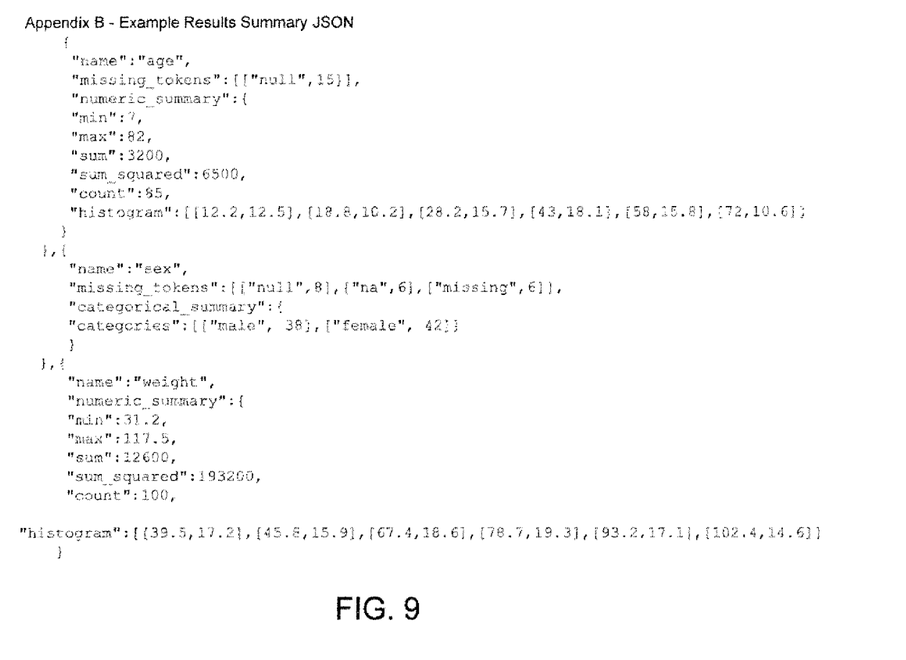
FIG. 9 an example of a prediction results summary expressed in a JSON format.

FIG. 6 is a simple example of a graphical user interface display of a dataset. Here, the visual display lists the input fields, under the heading "Name", and for each field it shows the corresponding Type (ABC indicates a categorical field, and 123 signifies a numeric field), item Count, and numbers of instances Missing and Errors in analyzing the set. As indicated in the heading bar, the summary table can be sorted on any of these parameters, in ascending or descending order. The last (right) column labeled "Histogram" shows graphically, in bar graph style, a summary of the dataset, with regard to each input field. The class fields have only a few possible values (e.g., "male"—"female"), while the numeric fields are represented by a plurality of histogram bins, showing graphically the distribution of the data based on those variables. As discussed above, JSON messages can be used for efficiently transmitting these kinds of summary results. An example is shown in FIG. 9, discussed later.

Speedup Based on Partial Results

In a preferred embodiment, multiple model updates can be generated during a single pass of the data. Put another way, a small sample of the overall data is often sufficient to generate a good quality model update. Implementing an early model update can save substantial processing time. The question is, at what point is the partial results data sufficient to make a profitable split.

Figure 2:
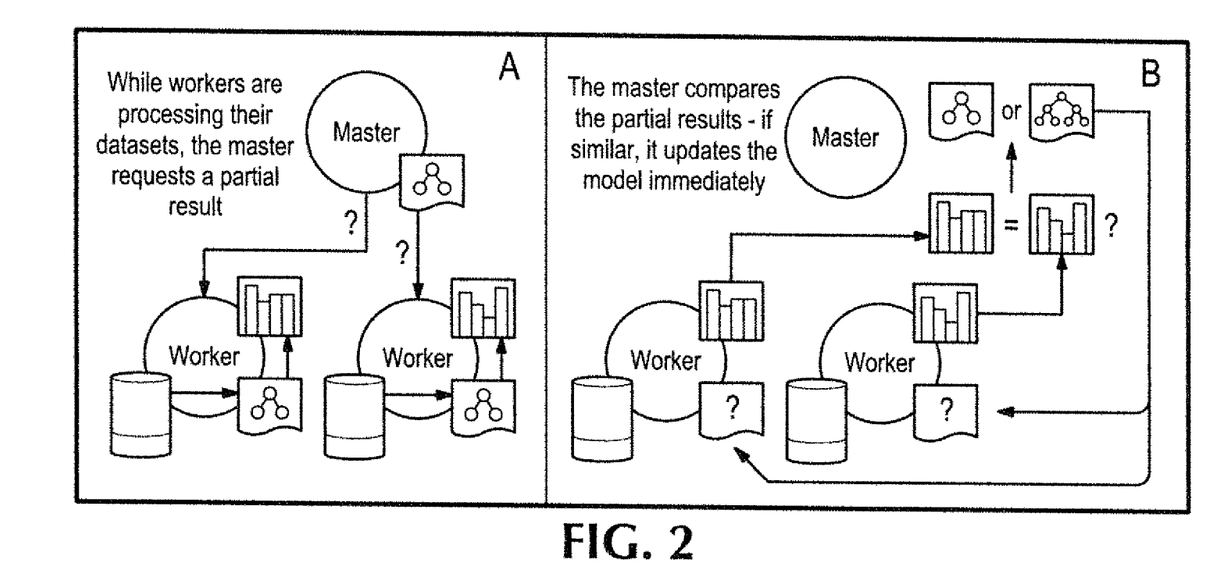
FIGS. 2A-2B are simplified conceptual diagrams that illustrate a method for processing partial results received from worker or child processes in order to speed the construction of a decision tree model in accordance with the present disclosure.

We have discovered that a useful indication, as to whether or not an early split should be done, can be obtained comparing the workers' respective results, for example their approximate histogram results, while they are still processing their partition datasets. Referring now to FIG. 2A, in one embodiment, the master process can request a partial result while the workers are processing their datasets. Each worker responds with partial results, preferably in the form of an approximate histogram, reflecting the data processed to that point using the current model. The master compares the partial results. If the partial results are similar, the master updates the current model and immediately sends it to the workers. (The meaning of "similar" is described shortly.) The workers then process their partition datasets over the updated model, and continue iteratively as described. If the master determines not to update the model early, processing can continue as described above, until a stop criterion is met.

Importantly, the nature of the "partial results" can vary, depending on how the model building is distributed. In one embodiment, the job can be divided by dividing the training data set, as described above. Each worker process is charged with processing only its partition dataset. That job, of course, can be distributed to children worker processes as further described below with regard to FIG. 3.

In another embodiment, the job can be divided by node (leaf). That is, each worker is responsible for building the histograms, and reporting results, only for one or more assigned nodes. In another embodiment, the model building job can be distributed by assigning to individual workers (and their progeny) the task of building an individual histogram, and reporting those results, for only one input variable. Whatever the arrangement, at each level, the corresponding "local master" process merges the results as appropriate and passes them up to the next level, for the root master to assess updating the model under construction.

In one embodiment, partial results may be assessed by a master process as follows. First, a split score is generated for the current histogram, before additional results are merged. A second split score is generated after merging the available or requested partial results into the histogram. If the merged result (second split score) is substantially the same as the prior result, it is a useful indication that the subject histogram is "stable" and does not require further updates.

In an embodiment, the method calls for using the merged histogram, finding a set of points that partition the histogram into bins each having the same number of data instances, and then applying that set of points to generate split scores for each histogram. We use these points to generate split scores for each histogram. And finally, we calculate the "earth mover distance" between the score sets, a known indicator of how different two histograms are. For the early model update procedure to be successful, the data should not be ordered. To ensure a random ordering, the original dataset preferably is shuffled before it is partitioned and sent to the workers. In a preferred embodiment, along with a mean and a count, each bin maintains a hash map of counts for each category or leaf, as further illustrated below.

As mentioned, we have expanded the use of histograms in new ways. In particular, our extended approximate histograms provide enhanced efficiency in reporting results from workers to master processes, and processing those results (which may be partial results) in connection with building a decision tree. Our goal is to capture and convey information that relates the input field to the objective field. The challenge is that some variables may be numeric while others are categorical. There are four types of field summaries to consider. The objective field can be either categorical (which means a classification problem) or numeric (which means a regression problem). The input field also may either be categorical or numeric. We address all four possible combinations. We describe our extended approximate histograms in the following example. Assume the following dataset:

| Sex, | Age, | Weight, | First Name |
|---|---|---|---|
| "M", | 23, | 178, | "John" |
| "F", | 16, | 102, | "Sue" |
| "M", | 36, | 168, | "Chris" |
| "F", | 44, | 192, | "Chris" |
| "M", | 83, | 131, | "John" |
| "M", | 71, | 235, | "Chris" |

The numeric fields summaries for "age" and "weight" can use known histograms. Their bins contain only a mean and a count as we're not trying to capture correlations between fields. The categorical fields, "sex" and "first name", can use a list of category counts as the summary. For the first example, let's say we want to predict "weight" using "age" as an input field. This means a numeric input field and a numeric objective field.

"name":"age",
  "missingcount":0,
  "summary":
  {"min":7,
    "max":82,
    "count":85,
    "histogram":[[19.5,2,280],[40.0,2,360],[77.0,2,366]]
  }
}

The histogram shows, for the input named "age," in each bin, the mean value of weight, number of counts, and the sum of the "weights" for the people in the bin. This is sufficient information to evaluate potential splits for better predicting "weight" given "age".

Next, the object is to predict "weight" using "sex" as an input field. This is an example of a categorical input with a numeric objective.
{
  "name":"sex",
  "missing_count":0,
  "summary": {"categories": [["M" 4 712] ["F" 2 294]]}
}

The format is similar to the previous one, except now each bin contains a category (instead of a mean). Each bin still captures the count and the sum of the "weights". This gives us enough information to evaluate a split on "sex" in order to predict "weight".

Next, assume the goal is to predict "sex" given "weight". This is a numeric input field and a categorical objective field. This is the type of situation for which we devised extended histograms. In our extended histograms, in some embodiments, each bin may include a "map" of category counts (in this case, sex). These maps enable correlating how a numeric field (weight in this illustration) affects a categorical field (sex). Here is the example:

```
{
    "name":"weight",
    "missing_count":0,
    "summary":
        {"min":102,
         "max":235,
         "sum":1006,
         "sum_squares":179562,
         "count":6,
         "histogram": [[19.5, 2.0, {"F":1,"M":1}],
                      [40.0, 2.0, {"F":1,"M":1}],
                      [77.0, 2.0, {"M":2}]]
        }
}
```

Finally, the case of predicting "sex" given a "first name". This illustrates a categorical input field with a categorical objective field. In this case, in some embodiments, we maintain a "map of maps" for counting the occurrences of any of the possible combinations between those two categorical fields. Although we use a maps of maps (a sparse encoding of the occurrences), it could also be implemented with a matrix (a dense encoding of the occurrences).

```
{
    "name":"first name",
    "missing_count":0,
    "summary": ("categories": {"John":{"M":3)
                               "Sue":{"F":1}
                               "Chris":{"M":2,"F":1}}
}
```

Efficient Computation of Decision Trees Using a Scalable Network of Computers The previously defined tree growing method works well for a small number of workers but can be problematic when scaling to many workers. The bandwidth to receive the histogram results and send model updates could overwhelm the master. Also, the master may not have the CPU resources required to merge the histogram results in an acceptable time frame.

To alleviate the pressure on the master, in one embodiment, a system may be used that comprises a tree structured network of computers to distribute the tasks. The master node preferably will only send models, send update requests, and receive histogram results from a small, predefined number of children workers. (For simplicity, the drawings show two children). Those workers (children) will only communicate with their parents and their own children. The depth of the tree may be determined by the desired total number of computers.

Figure 3:
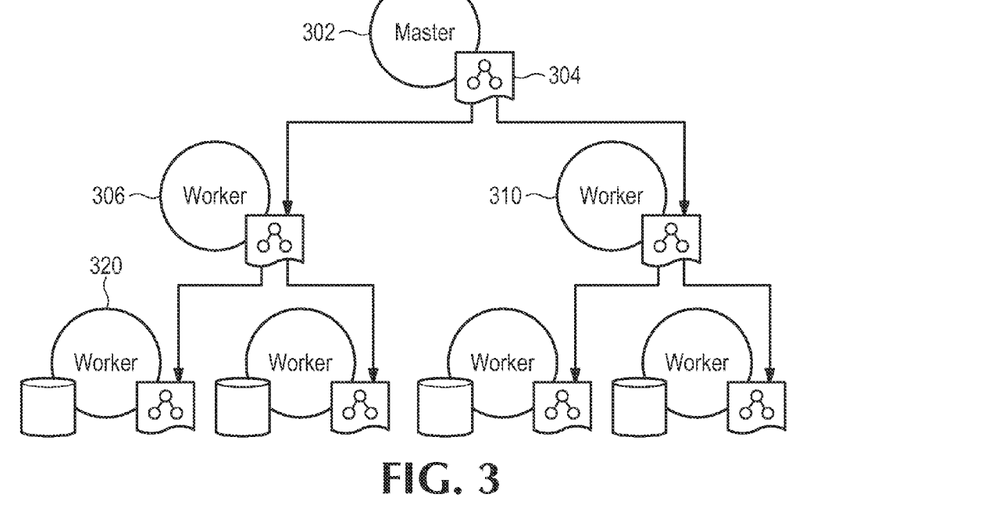
FIG. 3 is a simplified conceptual diagram that illustrates distribution of a decision tree model from a master node to a group of worker processes in a scalable, tree-structured network of processors, in accordance with the present disclosure.

FIG. 3 is a simplified conceptual diagram that illustrates distribution of a decision tree model from a master node to a group of worker processes in a scalable, tree-structured network of processors, in accordance with the present disclosure. In operation, as shown in the drawing, the master 302 distributes a model 304 to its workers 306, 310, and each worker in turn distributes the model to its child workers, for example 320. The concept is not limited to a binary tree. Nor is the concept limited to two levels, more may be employed. In this way, communication bandwidth requirements are limited. A request from the master for partial results can likewise be distributed down the tree, from each parent process to its respective children.

Figure 4:
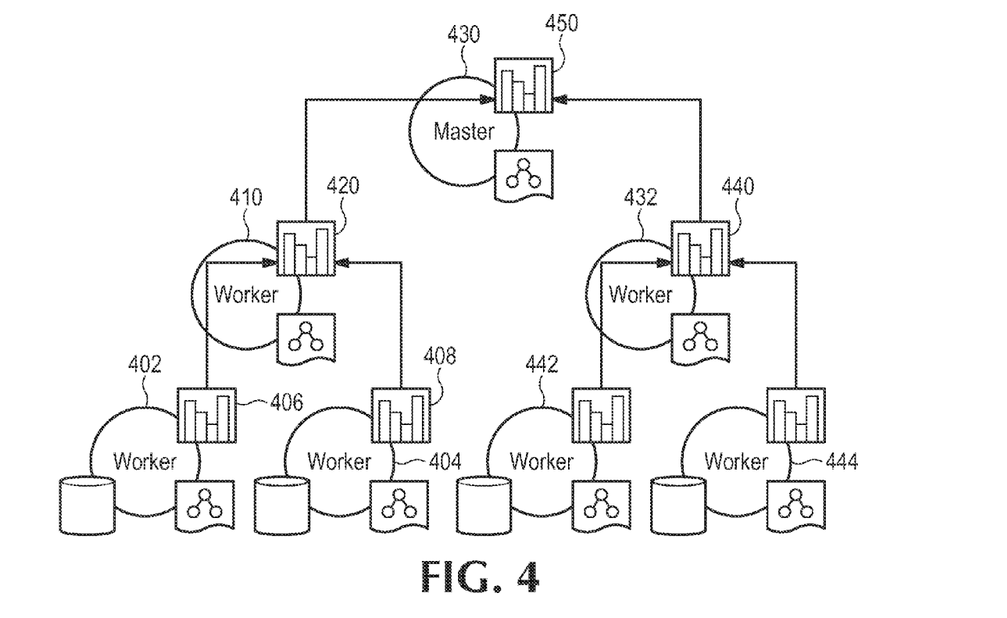
FIG. 4 is a simplified conceptual diagram illustrating a method for worker processes in a scalable, tree-structured network, to collect approximate histogram results from their immediate children worker processes, combine the histogram results, and send the combined histogram results to their respective immediate parent processes, in accordance with another aspect of the present disclosure.

In response to a request for partial results, each child process sends its results, for example in the form of a set of histograms, to its immediate parent process. In this discussion, we will sometimes refer to a histogram in the singular. It is understood that, in practice, many histograms will be processed as described, and "a histogram" may in fact refer to a related set of histograms, for example a set of histograms, one per input variable, at a given node. Referring now to FIG. 4, child workers 402, 404 each send their histogram results 406, 408 respectively, to their common parent, namely worker 410. Worker 410 combines its histogram 420 with the children histograms 406, 408 to update the combined histogram 420. Worker 410 then passes the updated histogram up to its parent, namely master 430. The same process occurs on the other side of the drawing, so that worker 432 sends a combined histogram 440 to the master 430. The histogram 440 includes combined results from workers 442 and 444. In general, as illustrated in FIG. 4, each parent process in the network combines its histogram results with those of its children, and then transmits only the combined results to its parent. The master merges the histograms it receives as described above to form a merged histogram 450. This network structure allows the tree model building to be scaled to any number of machines without overwhelming the master.

Fast Classifications for a GBRT

The methods defined above can be used to create a variety of predictive tree models. One useful model is the gradient boosted regression tree (or GBRT). GBRTs are collections of regression trees. To make a prediction with a GBRT, each of its trees are evaluated and their outputs summed together (prediction=tree 1 output+tree 2 output+ . . . +tree n output).

GBRTs can also be used for classification problems, where predictions are categories rather than numeric (such as apple, orange, or banana). To do this, a GBRT is built for each category. Their prediction outputs are a number from 0 to 1, representing their confidence that the example is a member of their class.

Grown on a large dataset, a GBRT may include many regression trees. A GBRT with 500 trees would be large but not uncommon. GBRTs used for classification will have a GBRT for each class. This means a set of GBRTs for classification can lead to an explosion of individual trees. For example, if we had a classification problem with 50 classes, each might have a GBRT with 500 trees giving us 25,000 trees overall.

Traditionally, when making predictions, the trees for each class are summed to determine which class has the largest score (and therefore the best answer). This requires evaluating each tree, which as shown in our previous example, may take a significant amount of computation time. Another aspect of the present invention includes a novel way to minimize the time necessary to make classifications.

Figure 5:
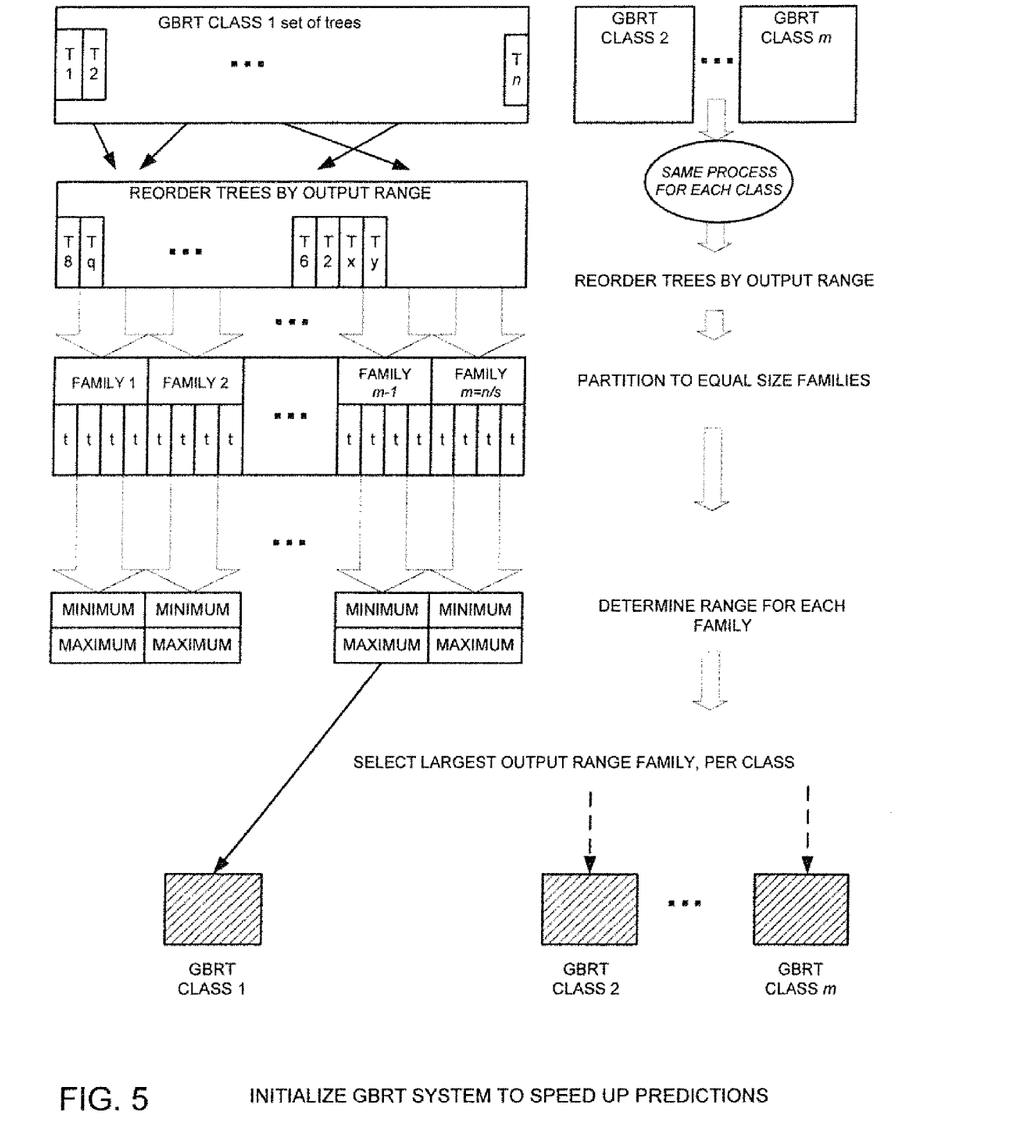
FIG. 5 is a simplified conceptual flow diagram illustrating a method for initializing or characterizing a group of classification GBRTs to support rapid predictions using the GBRTs in accordance with another aspect of the present disclosure.

FIG. 5 is a simplified conceptual flow diagram illustrating one example of a method for initializing or characterizing a group of classification GBRTs to support rapid predictions using the GBRTs in accordance with another aspect of the present disclosure. To initialize the system for predictions, we do the following once for classification GBRTs.

Referring to FIG. 5, in one embodiment, the method comprises, for each class's GBRT:

Order the GBRT's trees by their output range (the difference of their maximum and minimum outputs). If the trees are individually weighted, multiply the outputs by the corresponding weight.

Divide the trees into n equally sized families. The first family will contain the trees with the largest output range, the last family will contain the trees with the smallest output range.

Calculate the maximum and minimum output range for each family by summing the maximum and minimum outputs of each tree, respectively.

Figure 7:
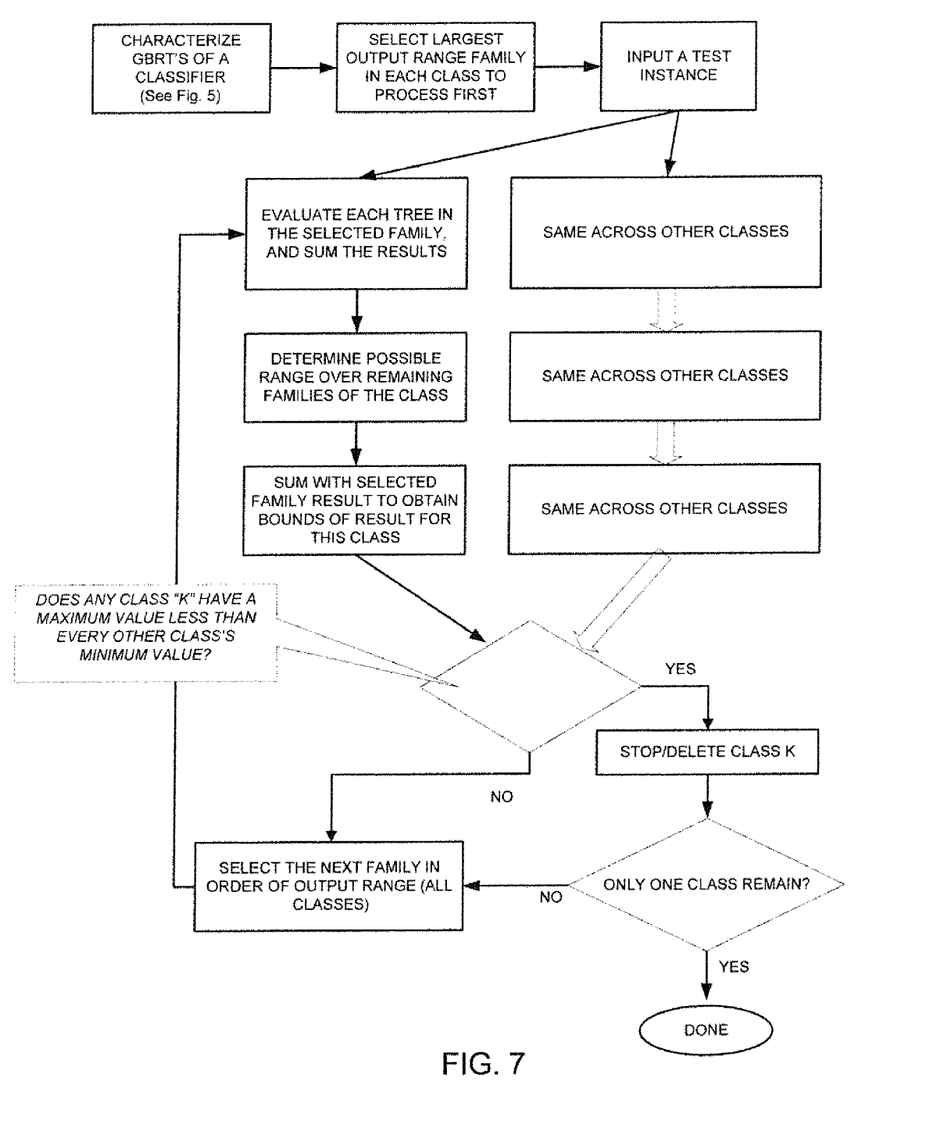
FIG. 7 is a simplified flow diagram illustrating a fast method for classifying a test instance using GBRTs in accordance with the present disclosure.

Now that we have maximum and minimum values for each class's tree families, our system in a preferred embodiment can use this data for fast predictions. FIG. 7 is a simplified flow diagram illustrating a fast method for classifying a test instance using GBRTs in accordance another aspect of the present disclosure. The method may proceed generally as follows.

For each class, evaluate and sum the trees in the largest tree family (the family with the largest output range).

Using the values from the previous step, find the possible range for each class by summing the maximum and minimum values of the remaining families, respectively.

Delete any class whose maximum range is less than any other class's minimum range.

Repeat the previous three steps until only one class remains.

This method reduces unneeded tree evaluations and speeds up the prediction process.

A Compact JSON Format for Representing Trees

Figure 8:
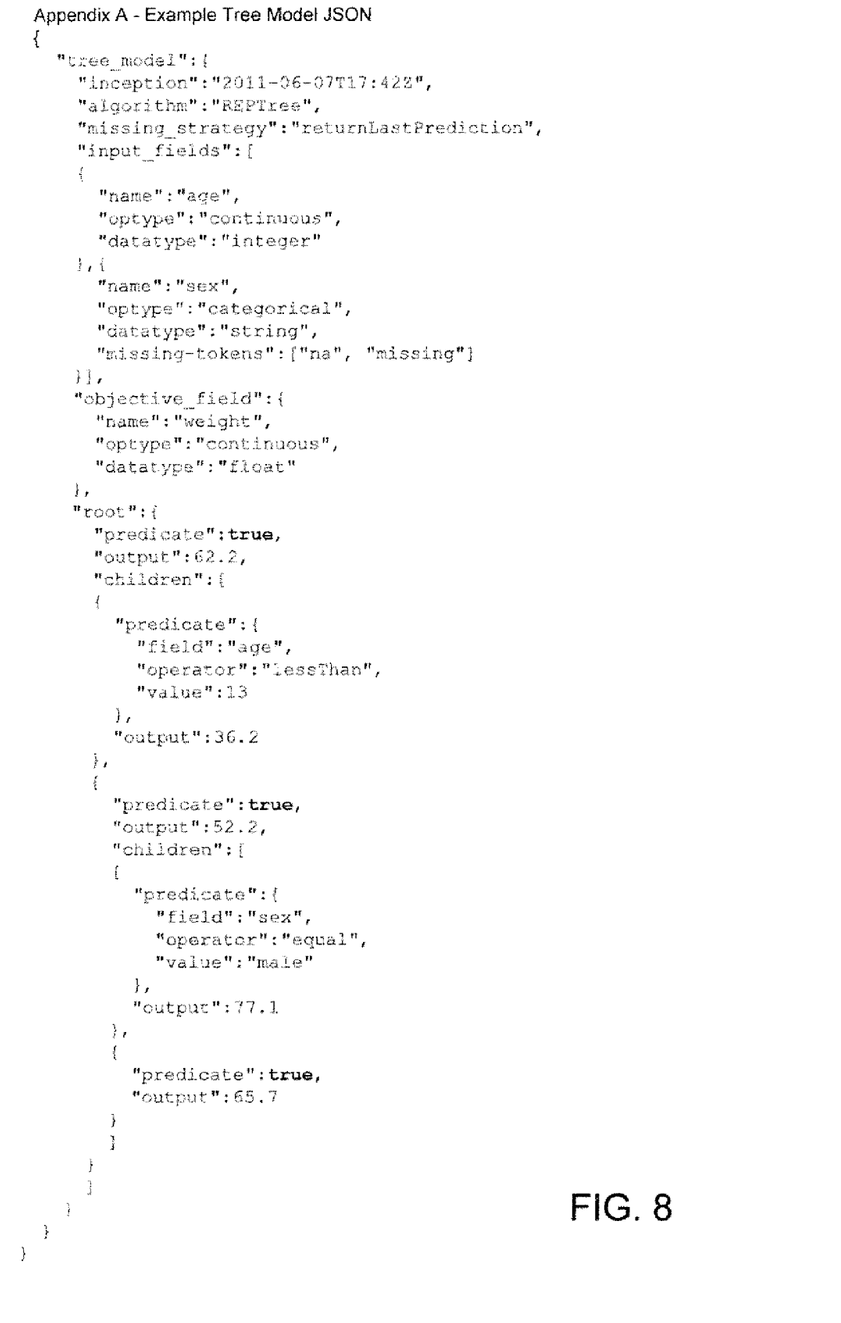
FIG. 8 is an example of a decision tree model expressed in a compact JSON format.

Our system in one embodiment uses a JSON format to represent our tree models and the results messages that are communicated between the worker nodes and the master. This JSON format allows our models to be much more compact than the equivalent model in the standard PMML format. FIG. 8 is an example of a decision tree model expressed in a compact JSON format.

POW FIG. 9 shows a simple example of a prediction results summary, expressed in a JSON format. This format is useful for summarizing and visualizing datasets. Here, we see for each variable or input field, age, sex and weight, a summary of the corresponding prediction results. For the input variable named age, this is a numeric field, and the results include a numeric summary (min, max, etc.). The code shows a histogram for this variable (age): "histogram":[[12.2,12.5],[18.8, 10.2],[28.2,15.7],[43,18.1],[58,15.8],[72,10.6]]. The reader can observe the histogram has six bins, each bin described by a corresponding pair {median, count}. As illustrated, the counts need not always be integers. For the variable sex, there are only two categories, and the results for each are shown. The counts total only 80 for this variable, because 20 other instances are variously indicated as null, na or missing, out of the overall 100 input instances. Finally, the third variable named weight is also summarized. Here, the entire 100 samples are accounted for (count=100), and the numeric summary is shown. In this case, the weight variable results are summarized (or compressed) into a histogram having six bins.

Figure 10A:
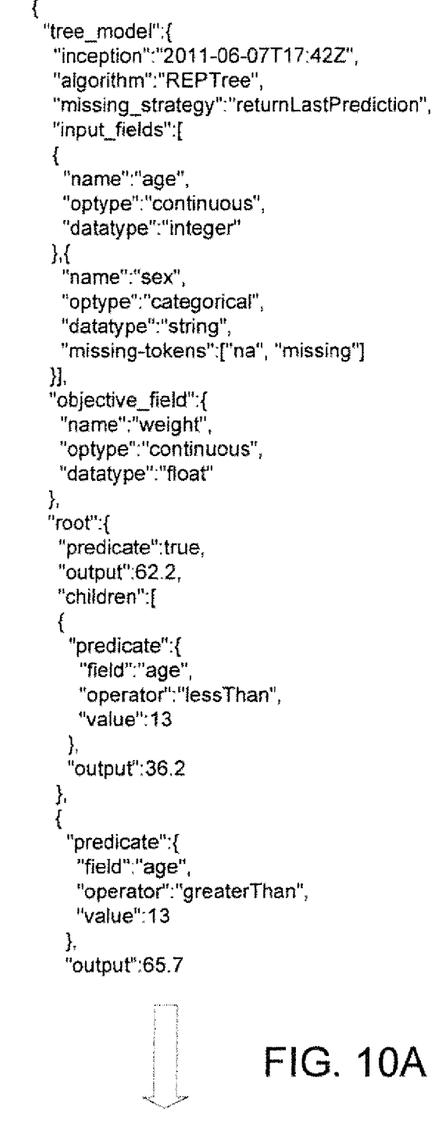
FIG. 10A is another simple example of a decision tree model expressed in a compact JSON format.
Figure 10B:
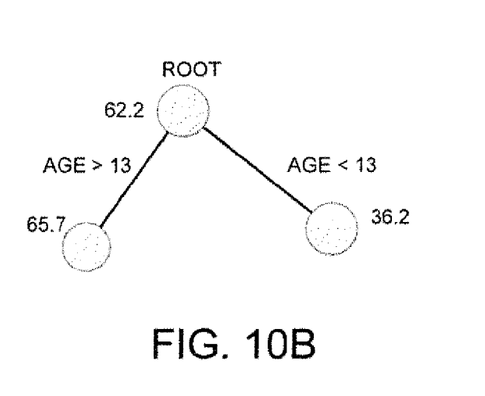
FIG. 10B is a decision tree diagram corresponding to the code of FIG. 10A.
Figure 10C:
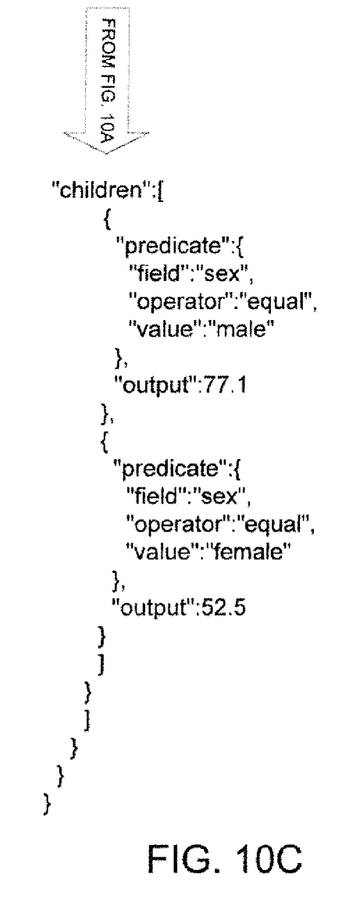
FIG. 10C is a continuation of FIG. 10A.
Figure 10D:
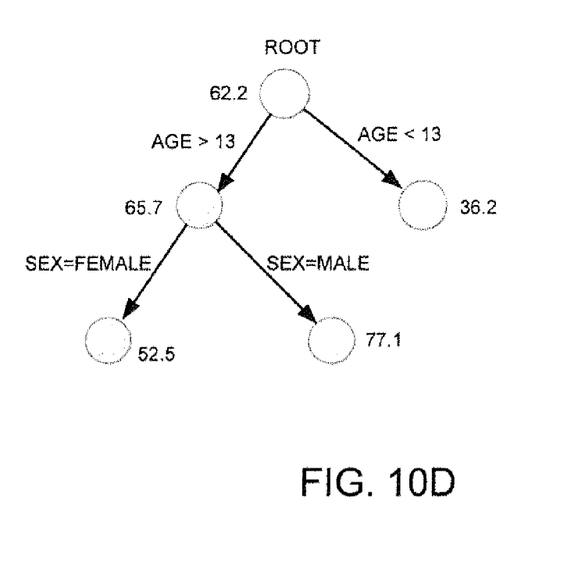
FIG. 10D shows the decision tree diagram of FIG. 10B augmented to reflect the additional layer expressed in the code of FIG. 10C.

FIG. 10A is a simple example of a decision tree model expressed in a compact JSON format. FIG. 10B is a decision tree diagram corresponding to the code of FIG. 10A. FIG. 10C is a continuation of FIG. 10A. FIG. 10D shows the decision tree diagram of FIG. 10B, augmented to reflect the additional layer expressed in the code of FIG. 10O.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method for machine learning a dataset to construct a decision tree model, the method comprising the steps of:
   (a) initializing a master process with an initial model corresponding to a root of a decision tree;
   (b) initializing a plurality of worker processes;
   (c) partitioning the full dataset into a plurality of partition datasets;
   (d) distributing the initial model to each of the worker processes;
   (e) distributing each of the partition datasets to a respective one of the worker processes;
   (f) in each worker process, processing its corresponding partition dataset based on the distributed initial model to form local results;
   (g) in each worker process, compressing its corresponding local results;
   (h) in each worker process, transmitting the compressed results to the master process;
   (i) merging the compressed results received from the worker processes;
   (j) based on the merged results, updating the model by adding one new layer;
   (k) distributing the updated model to the worker processes; and
   (l) repeating steps (f)-(k) until a stopping criterion is met;
   wherein the dataset includes at least one categorical result field and, for at least one of the worker processes, said compressing the corresponding local results includes forming an approximate histogram corresponding to the categorical result field; and
   wherein at least one worker process merges at least one categorical result approximate histogram from a child process together with at least one other categorical result approximate histogram from a different child process by summing its corresponding counts from the child processes for the corresponding category.

2. A computer-implemented method for building a predictive model for supervised machine learning, the method comprising the steps of:
   (a) initializing a master process with an initial model;
   (b) initializing a plurality of worker processes;
   (c) partitioning an input data stream to form a plurality of partitions;
   (d) distributing the initial model to the worker processes;
   (e) distributing each partition of the data stream to a respective one of the worker processes;
   (f) in each worker process, processing its corresponding partition based on a most recent one of the initial model, or an updated model, to form results;
   (g) in each worker process, transmitting the results to the master process in a form of data defining a plurality of approximate histograms;
   (h) requesting partial results while at least one worker process is still processing its partition dataset;
   (i) receiving partial results from the at least one worker process in response to a transmitted request;
   (j) comparing the received partial results;
   (k) based on the comparison, updating the model; and
   (l) transmitting the updated model to the worker processes.

3. The method according to claim 2 and further comprising:
   (m) forming new results in the worker processes using the updated model; and
   (n) repeating steps (h)-(m) until all of the worker processes have completed processing their respective partitions of the dataset.

4. The method according to claim 2 and wherein the request for partial results is transmitted by the master process to its immediate children worker processes.

5. The method according to claim 2 and wherein the comparing step determines whether the approximate histogram results from one worker process are similar to the approximate histogram results from another worker process.

6. The method according to claim 5 and further comprising, in a case that the approximate histogram results from one worker process are similar to the approximate histogram results from another worker process, updating the model without waiting for the partition datasets to complete an iteration.

7. The method according to claim 2 including:
   receiving compressed results in the form of histograms from at least two worker processes, which results may include merged results of corresponding child processes;
   merging the two histograms to form a merged histogram;
   using the merged histogram, selecting a set of cutoff points that partition the histogram into bins each having the same population count; and
   using the selected cutoff points, generating split scores for each histogram.

8. The method according to claim 7 wherein the compressed results histograms comprise extended classification histograms, and further comprising maintaining a hash map of category counts to enable correlating how a numeric field affects a categorical field.

9. The method according to claim 7 wherein the dataset includes a categorical input field and a categorical objective field, and the method includes generating a map of maps for counting the occurrences of at least one of the possible combinations between those two categorical fields.

10. The method according to claim 7 including estimating a category count at a point between two bins, by applying a linear interpolation based on a difference in the category counts between the two bins.

11. The method according to claim 7 and further, in a case that the model was not updated using the partial results, updating the model using final results after all of the worker processes have completed processing the data of their respective partitions of the dataset and forwarded their respective results.

12. A computer-implemented method for building a tree model corresponding to a dataset, the method comprising the steps of:
   (a) distributing plural partitions of the dataset from a master process to plural respective worker processes;
   (b) until a predetermined tree model building criterion is met with a finished first tree model, distributing a first tree model of the dataset from the master process to the plural worker processes;
   (c) processing the partition of the dataset at each worker process with the first tree model to obtain a local tree model result; and
   (d) updating the first tree model at the master process according to one or more of the local tree model results and returning to step (b), wherein at least one updating of the first tree model is according to local tree model results from fewer than all of the worker processes.

13. The method of claim 12 wherein the local tree model results from fewer than all of the worker processes are partial local tree model results and the method further comprises making a comparison of the partial local tree model results and updating the first tree model at the master process whenever the comparison meets a predetermined partial local tree model result criterion.

14. The method of claim 12 wherein the at least one updating of the first tree model is made while at least one worker process is still processing its local tree model result.

15. The method of claim 14 wherein the at least one updating of the first tree model is made before plural worker processes have completed their local tree model results.

16. The method of claim 12 wherein each local tree result includes an approximate histogram.

17. The method of claim 12 wherein the dataset includes at least one categorical result field and at least one of the local tree results includes an approximate histogram corresponding to the categorical result field.

18. The method of claim 17 wherein the approximate histogram includes at least one [category, count] data pair.

19. The method of claim 17 wherein the approximate histogram includes a hash map of category counts to enable correlating how a numeric field affects a categorical field.

20. The method of claim 12 wherein the at least one updating of the first tree model is a result of a request for partial local tree model results from the master process.

21. The method of claim 12 wherein the master and worker processes are distributed among plural computers.

22. The method of claim 21 wherein each of the master and worker processes operates on a different computer.

23. The method of claim 12 in which the first tree model is one of plural tree models of a gradient boosted regression tree (GBRT).

24. A computer-implemented method for building a tree model corresponding to a dataset, the method comprising the steps of:
   (a) distributing plural first partitions of the dataset from a master process to plural respective first worker processes;
   (b) distributing plural second partitions of the first partition at each first worker process to plural respective second worker processes;
   (c) until a predetermined tree model building criterion is met with a finished first tree model, distributing a first tree model of the dataset from the master process to the plural first worker processes and from each first worker process to its respective second worker processes;
   (d) processing the second partition of the dataset at each second worker process with the first tree model to obtain a local tree model result;
   (e) combining at each first worker process the local tree model results from its second worker processes to form a combined local tree model result; and
   (f) updating the first tree model at the master process according to the combined local tree model results from at least one first worker process and returning to step (c).

25. The method of claim 24 wherein the combined local tree model results from the at least one first worker process include partial local tree model results.

26. The method of claim 25 further comprising making a comparison of the partial local tree model results and updating the first tree model at the master process whenever the comparison meets a predetermined partial local tree model result criterion.

27. The method of claim 24 wherein the updating of the first tree model is made while at least one second worker process is still processing its local tree model result.

28. The method of claim 24 wherein each local tree result includes an approximate histogram.

29. The method of claim 24 wherein the dataset includes at least one categorical result field and at least one of the local tree results includes an approximate histogram corresponding to the categorical result field.

30. The method of claim 29 wherein the approximate histogram includes at least one [category, count] data pair.

31. The method of claim 29 wherein the approximate histogram includes a hash map of category counts to enable correlating how a numeric field affects a categorical field.

32. The method of claim 24 wherein at least one updating of the first tree model is according to local tree model results from fewer than all of the second worker processes and is a result of a request for partial local tree model results from the master process.

33. The method of claim 24 wherein the master and worker processes are distributed among plural computers.

* * * * *